Figure 1:
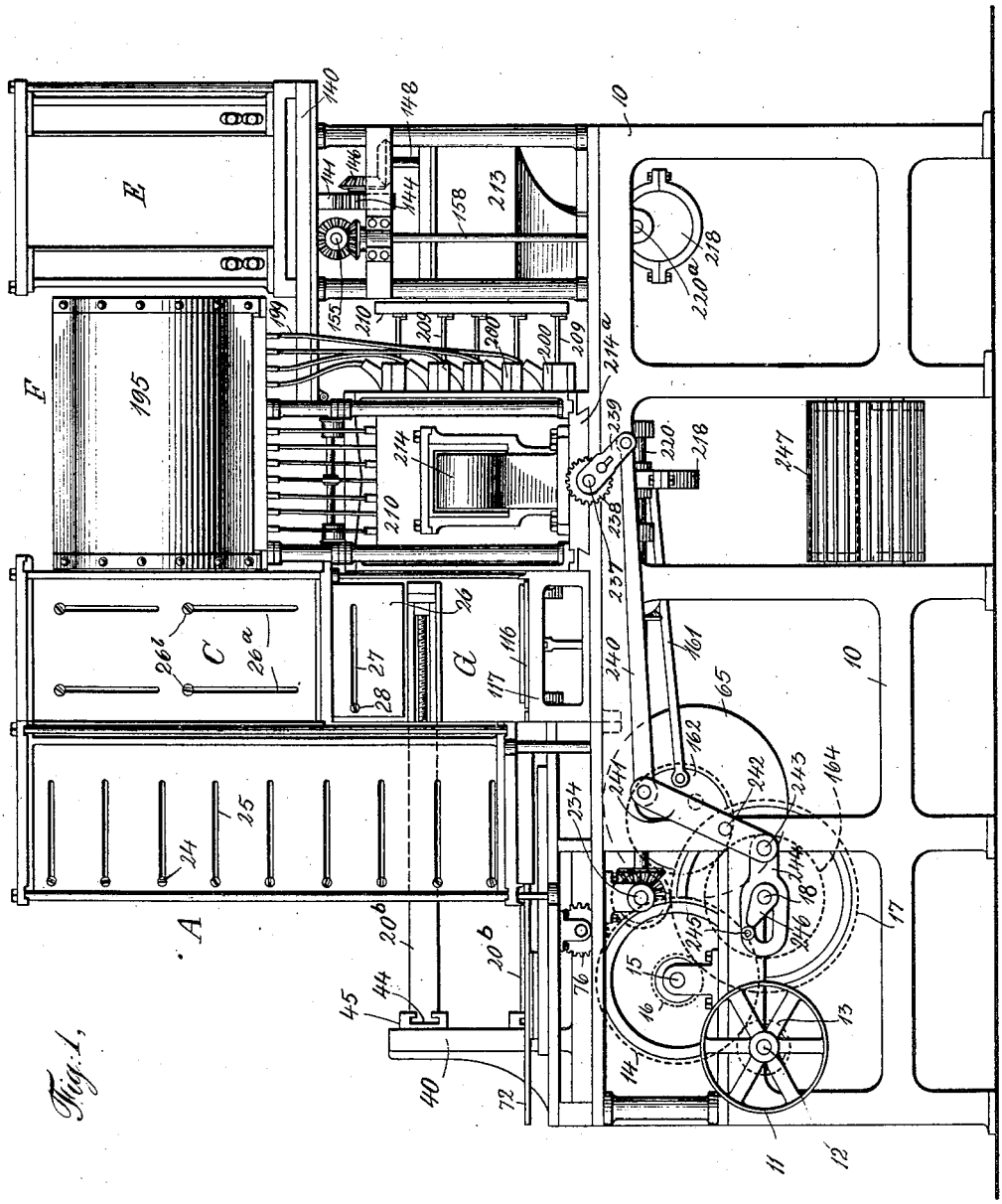

W. T. McRAE.
BOX MACHINE.
APPLICATION FILED MAR. 19, 1908.

935,535.

Patented Sept. 28, 1909.
19 SHEETS—SHEET 1.

Witnesses:
Max B. A. Doring.
Frank L. Stubbs.

William T. McRae, Inventor
By his Attorney
W. B. Hutchinson.

W. T. McRAE.
BOX MACHINE.
APPLICATION FILED MAR. 19, 1908.

935,535.

Patented Sept. 28, 1909.
19 SHEETS—SHEET 3.

Witnesses:
Max B. A. Doring.
Frank L. Stubbs.

William T. McRae Inventor
By his Attorney
W. B. Hutchinson.

W. T. McRAE.
BOX MACHINE.
APPLICATION FILED MAR. 19, 1908.

935,535.

Patented Sept. 28, 1909.
19 SHEETS—SHEET 4.

Witnesses:
Max B. A. Doring
Frank L. Stubbs

William T. McRae  Inventor
By his Attorney
W. B. Hutchinson

W. T. McRAE.
BOX MACHINE.
APPLICATION FILED MAR. 19, 1908.

935,535.

Patented Sept. 28, 1909.
19 SHEETS—SHEET 16.

Witnesses:
Max B. A. Doring
Frank L. Stubbs.

William T. McRae Inventor
By his Attorney
W. B. Hutchinson.

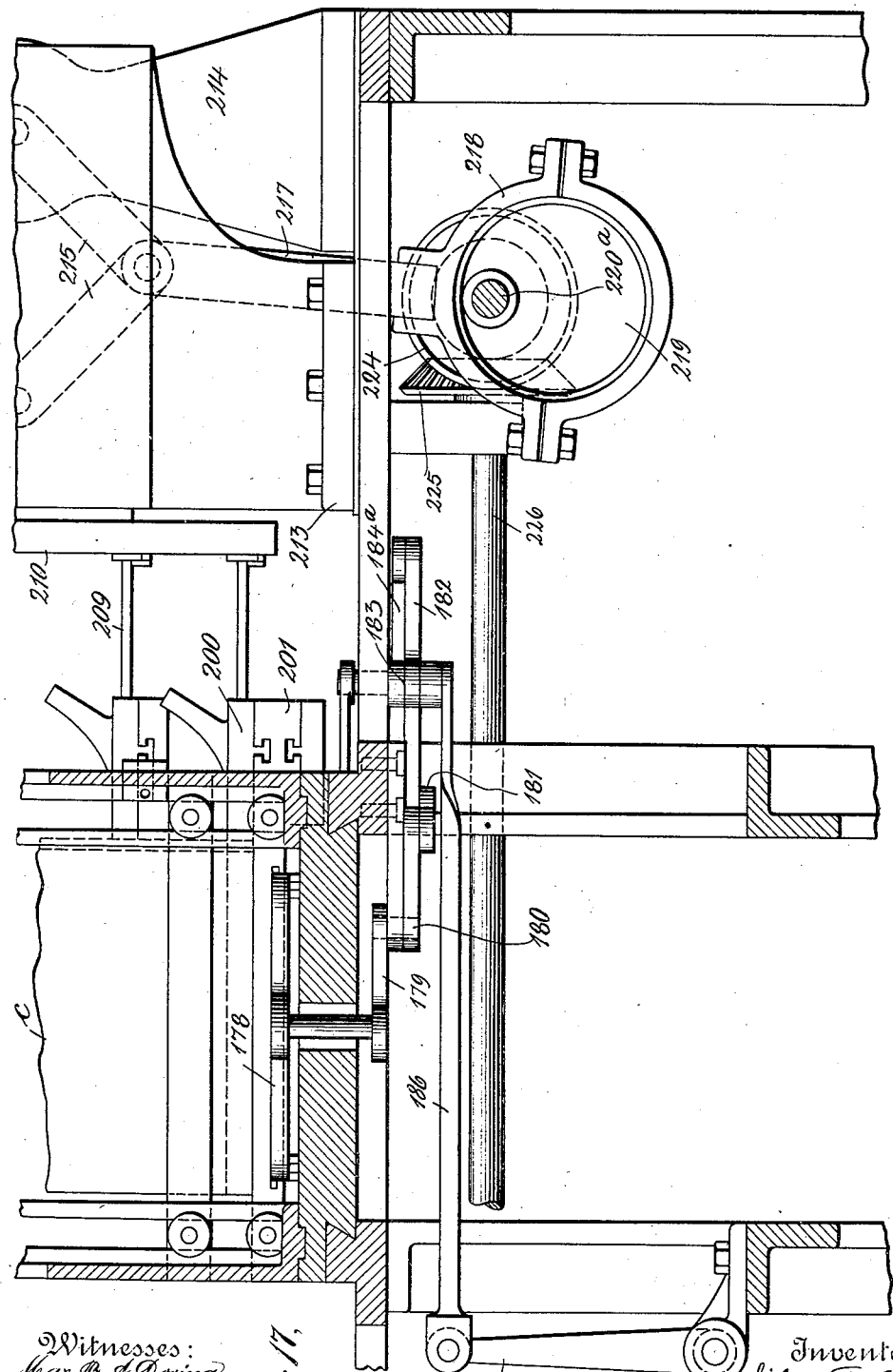

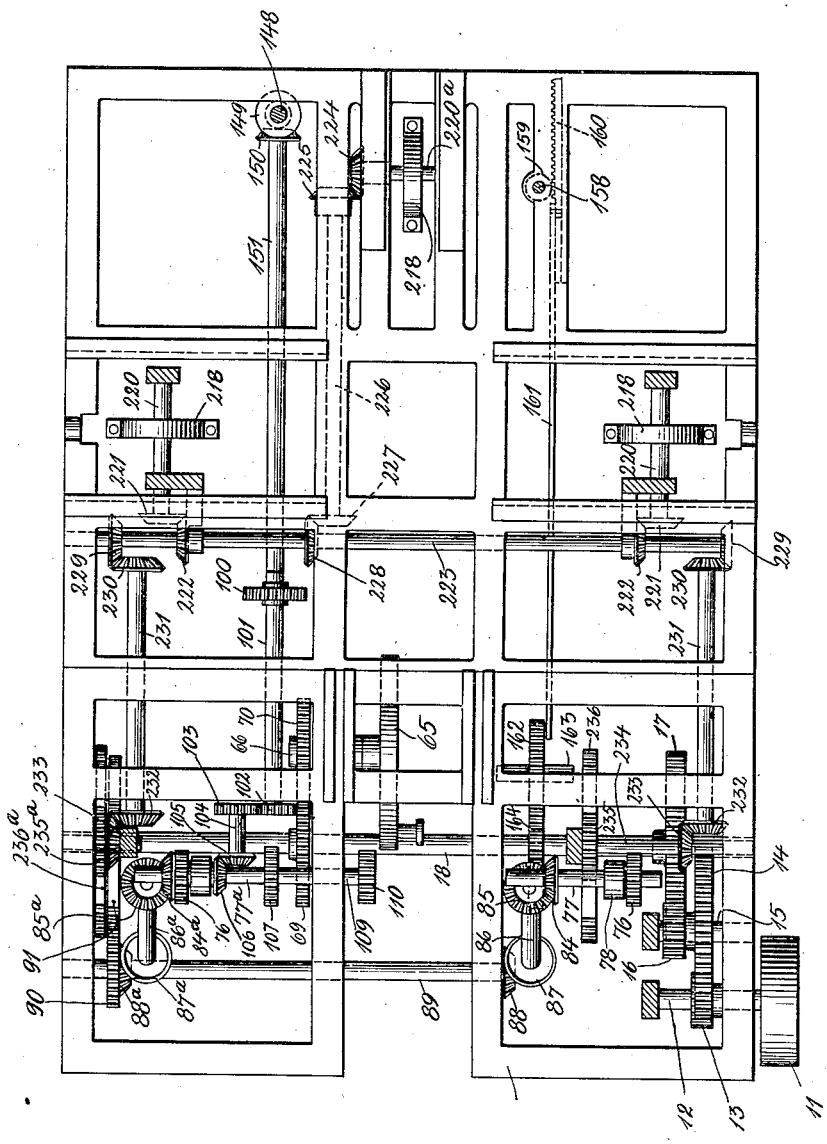

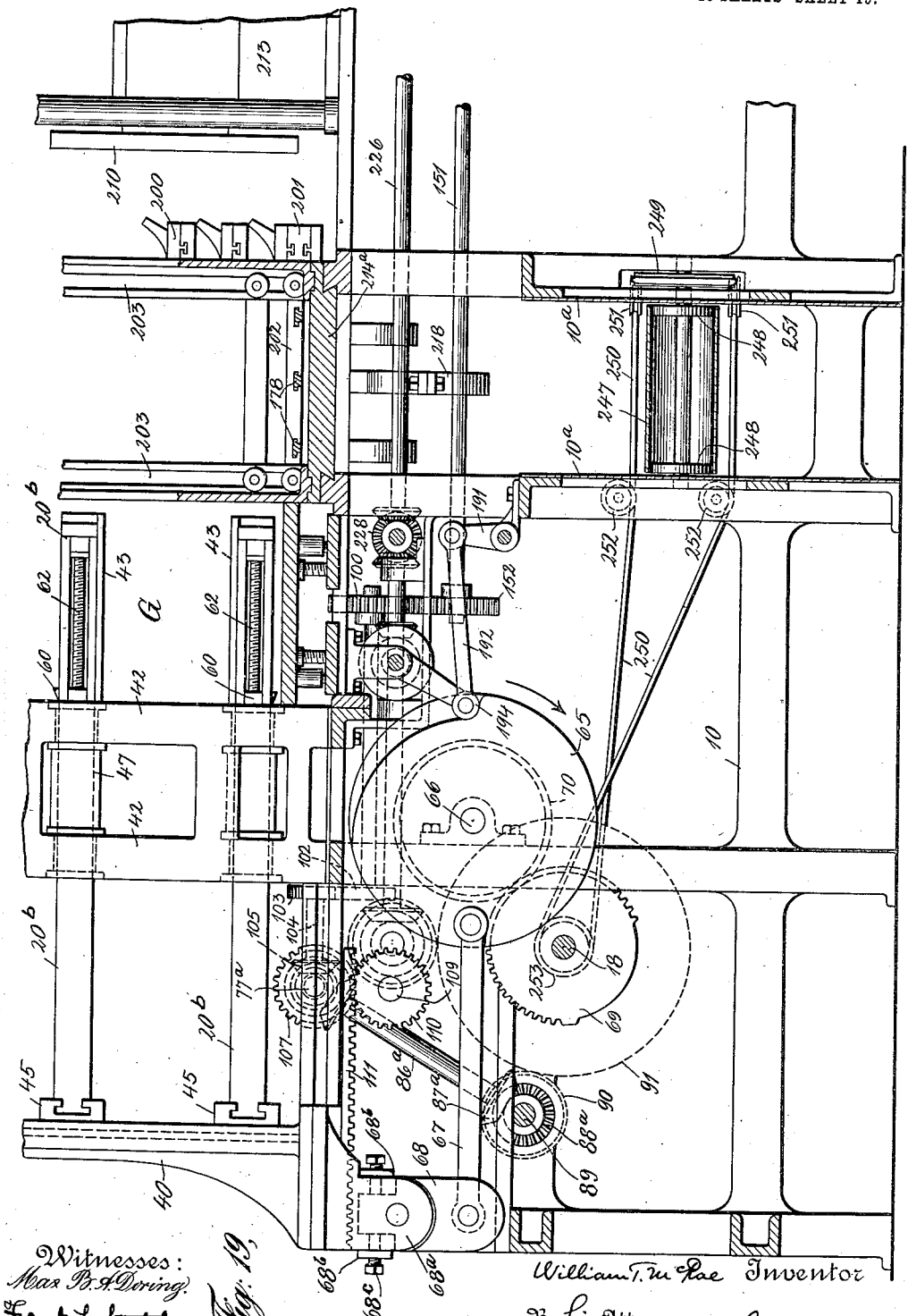

UNITED STATES PATENT OFFICE.

WILLIAM T. McRAE, OF PHILADELPHIA, PENNSYLVANIA, ASSIGNOR TO JOHN D. RISHELL, TRUSTEE, OF NEW YORK, N. Y.

BOX-MACHINE.

935,535.

Specification of Letters Patent. Patented Sept. 28, 1909.

Application filed March 19, 1908. Serial No. 422,068.

*To all whom it may concern:*

Be it known that I, WILLIAM T. MCRAE, of the city of Philadelphia, county of Philadelphia, and State of Pennsylvania, have invented a new and useful Improvement in Box-Machines, of which the following is a full, clear, and exact description.

My invention relates to improvements in making boxes, and more especially wooden boxes and packing cases.

This invention is an improvement on the construction shown in Patent No. 876,485, dated January 14th, 1908. My invention, like the former, is intended to provide means whereby the end pieces, side pieces, and bottom pieces of a box can be placed in hoppers, and the several parts automatically assembled around a central shaping device and then automatically nailed and the formed box ejected. In entering into the construction of the actual machine, I have found that the construction formerly disclosed had to be improved materially to the end that the machine could be made more perfect and capable of doing better work.

This invention relates, therefore, to improvements along the lines stated, with the general object of producing an efficient and very rapid working machine for turning out boxes or packing cases of any desired size within reasonable limits, and for turning them out well and cheaply made.

Reference is to be had to the accompanying drawing forming a part of this specification, in which similar reference characters indicate corresponding parts in all the views.

Figure 2:
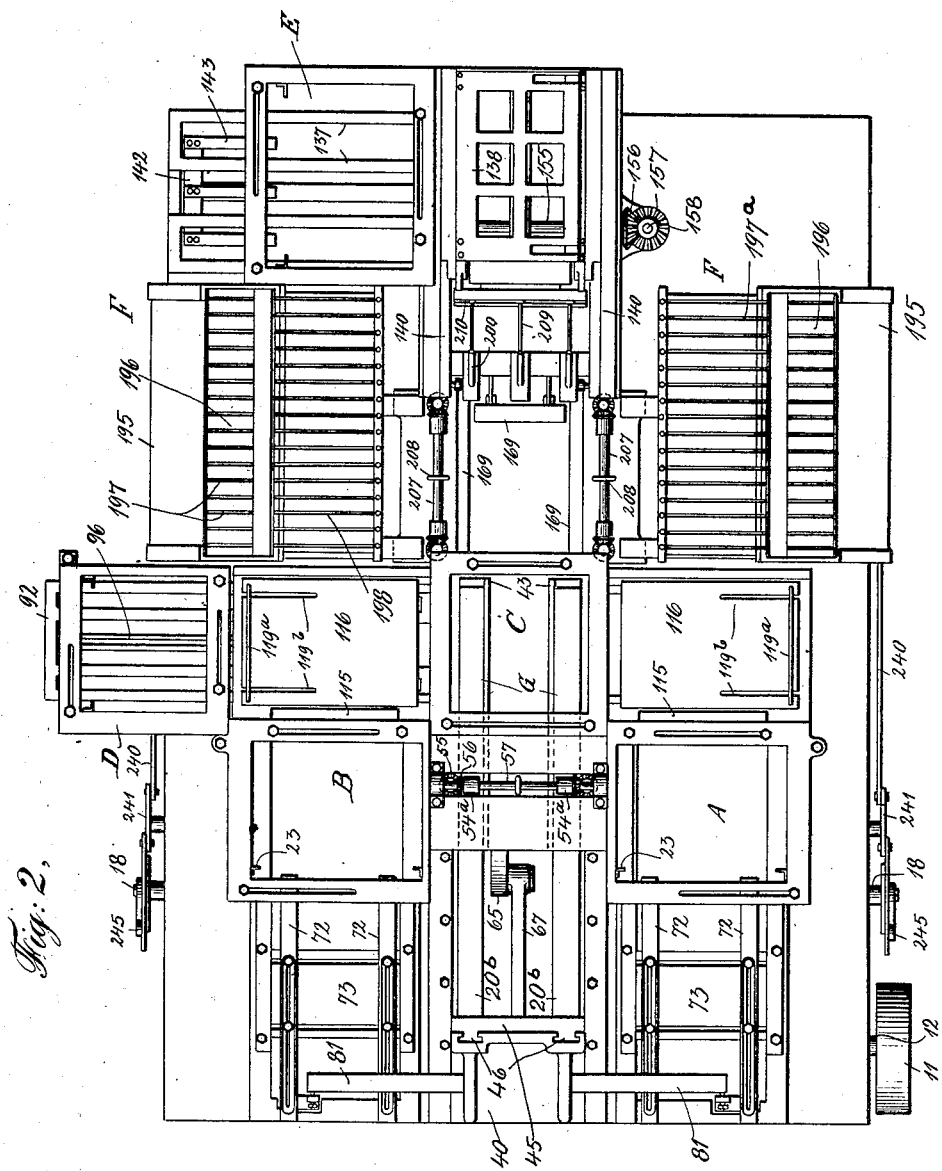
Figure 3:
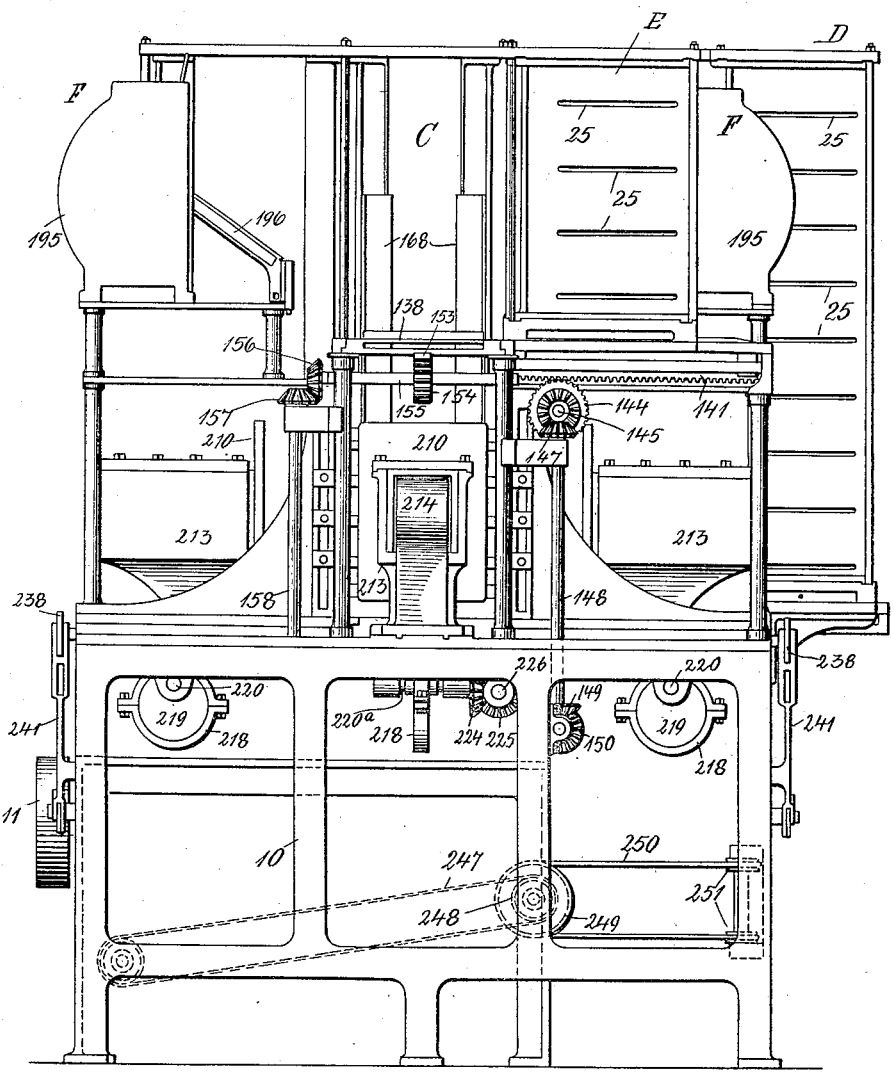
Figure 4:
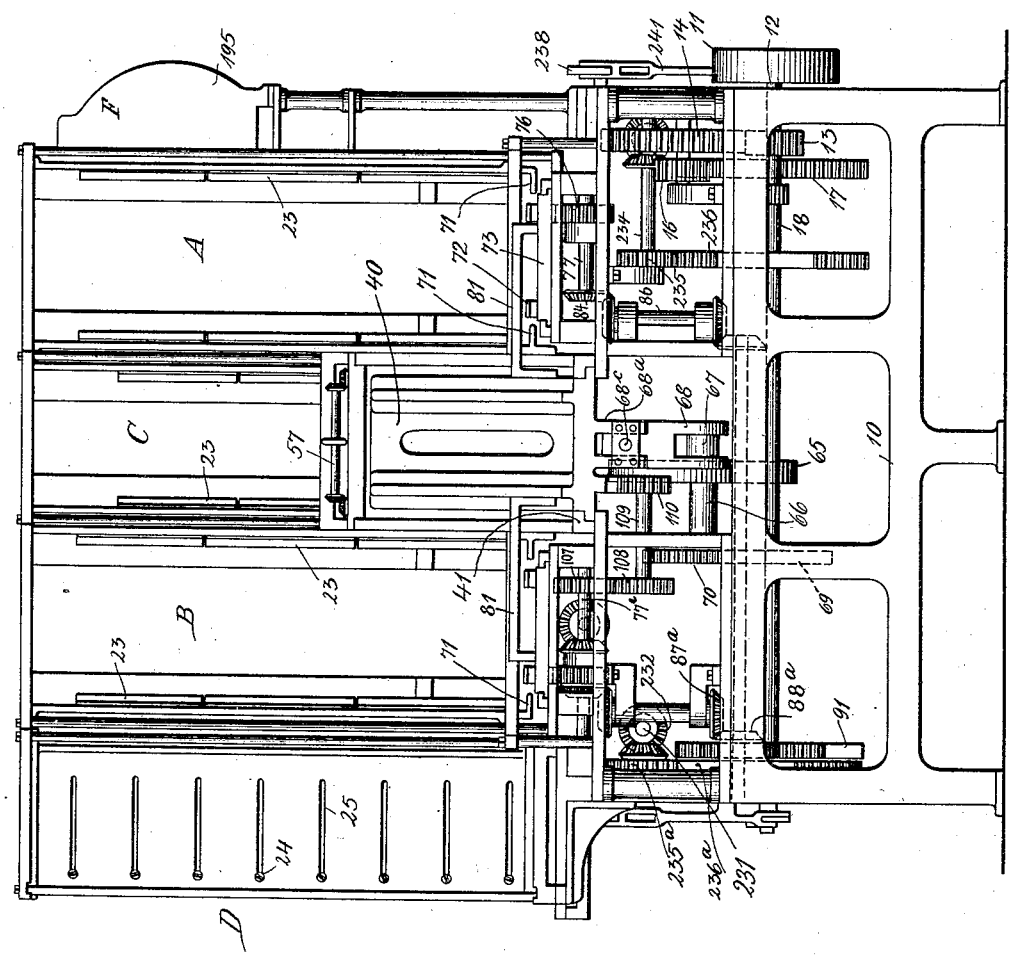
Figure 5:
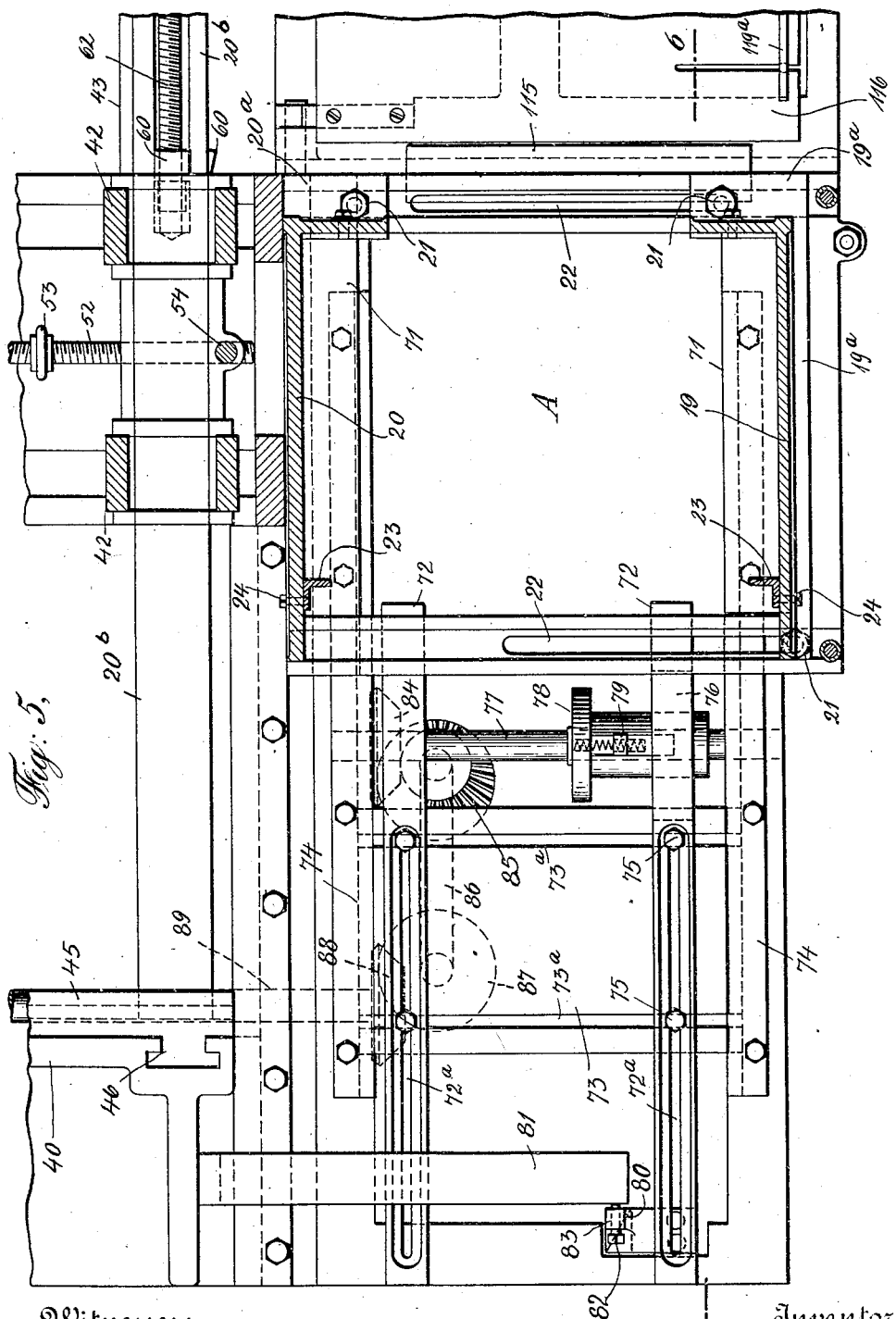
Figure 6:
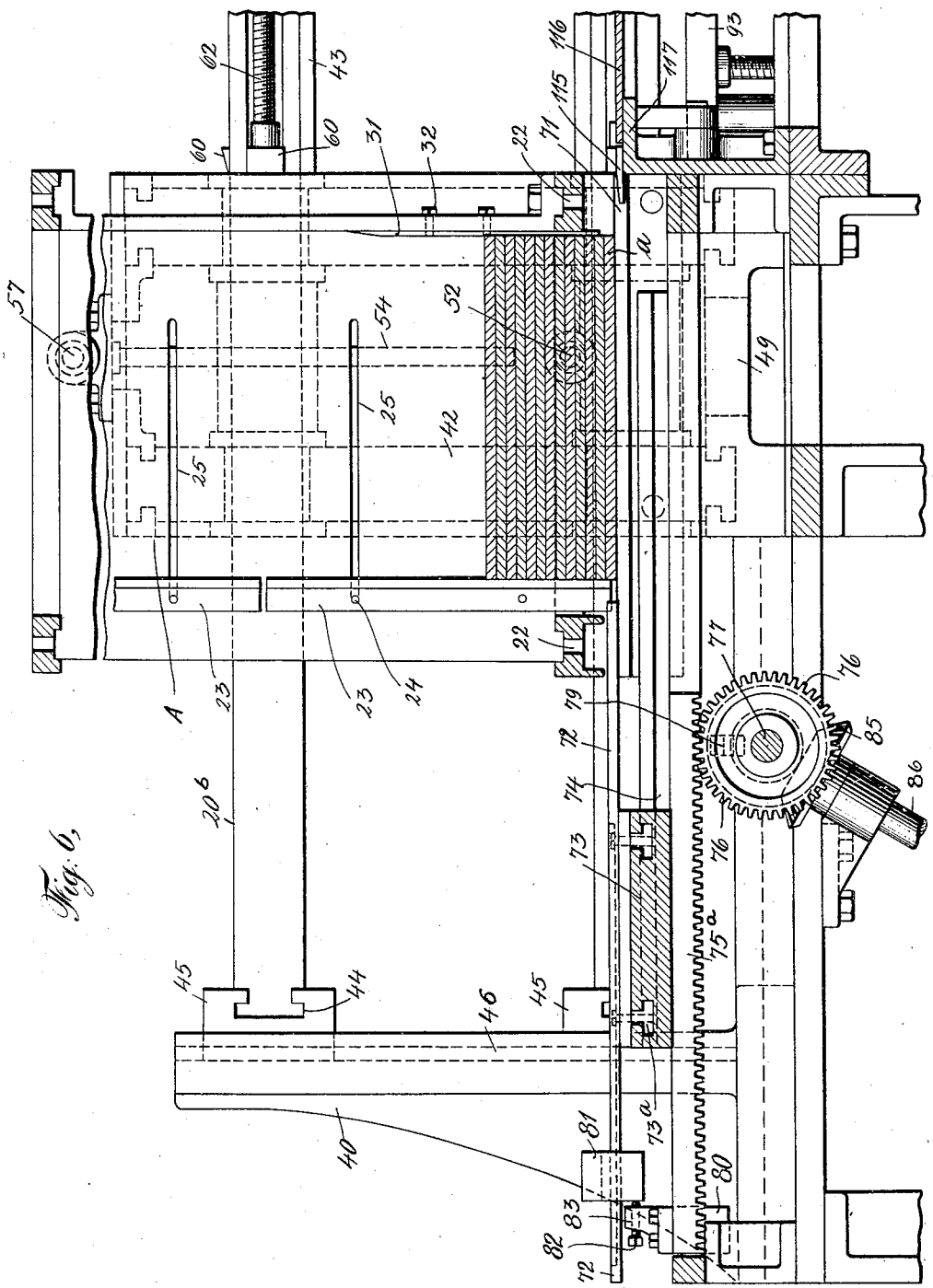
Figure 7:
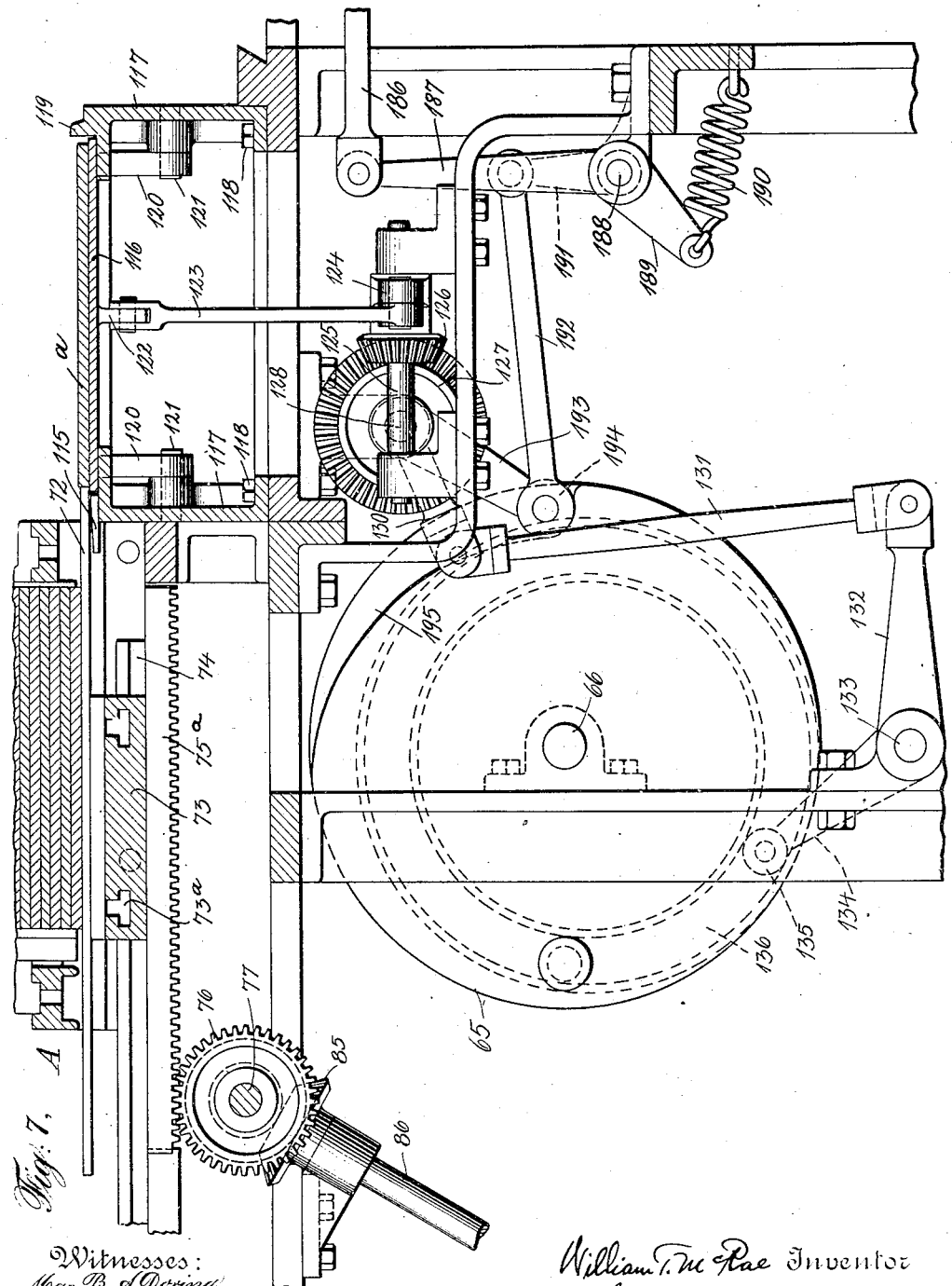
Figure 8:
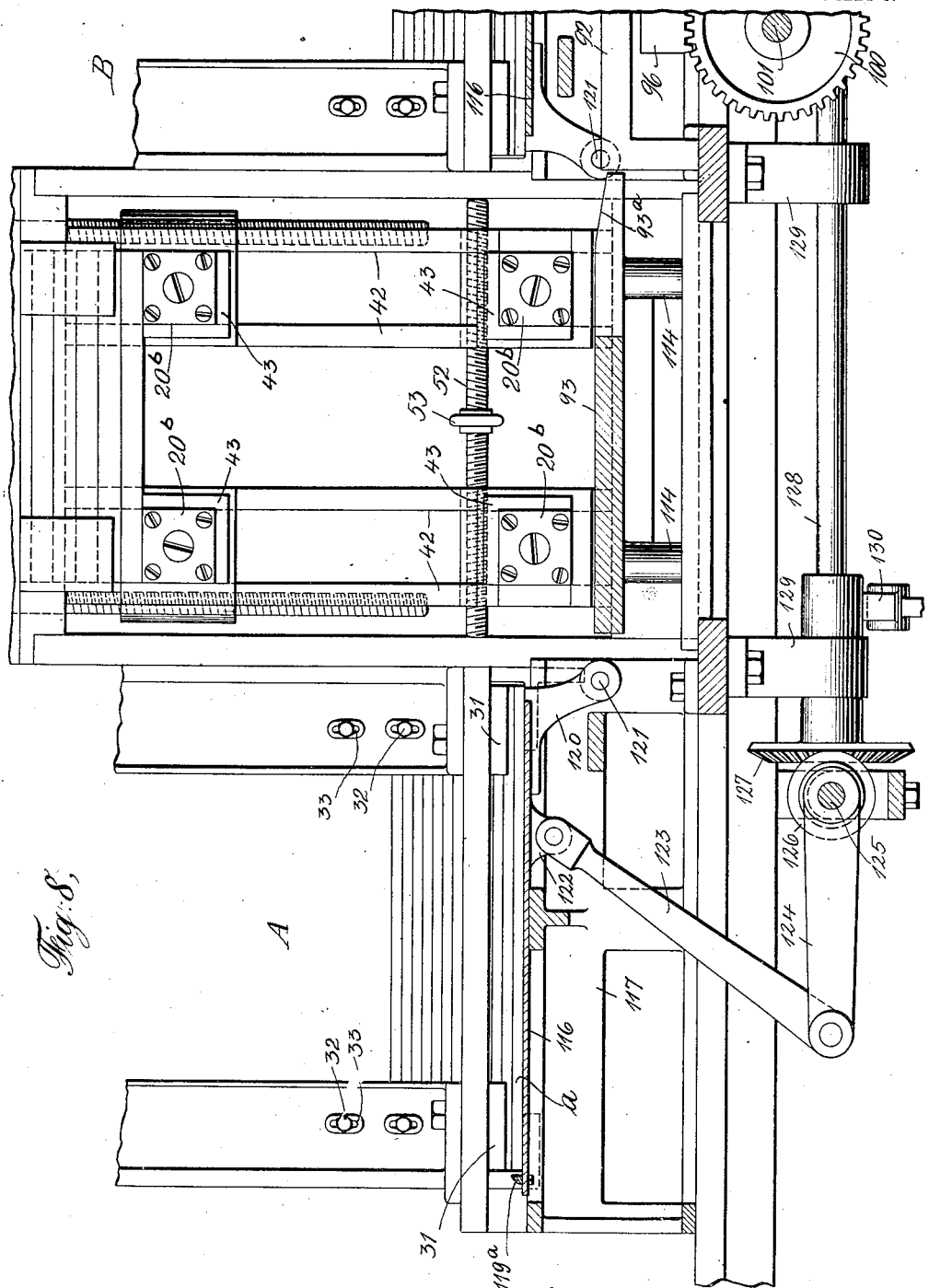
Figure 9:
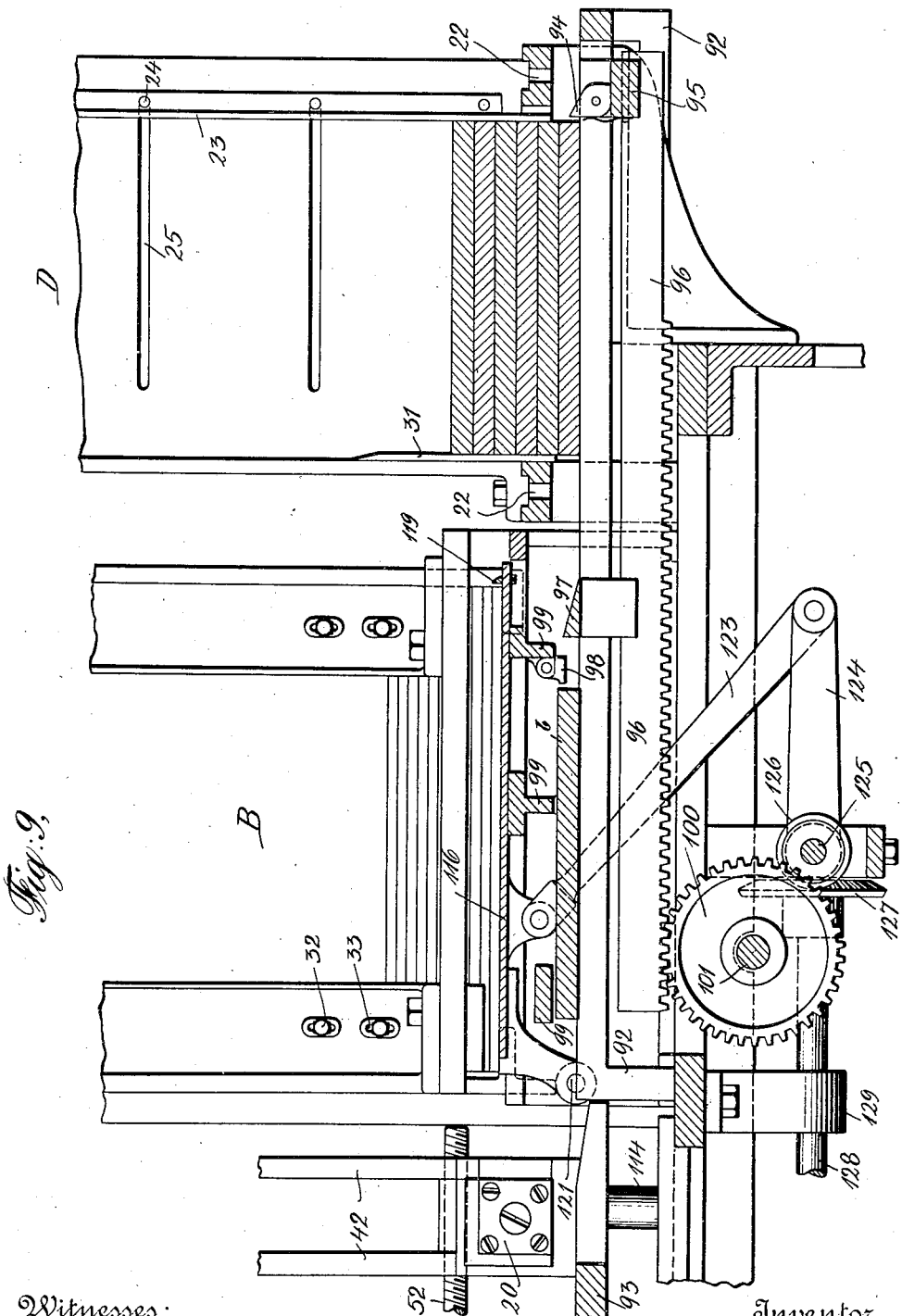
Figure 10:
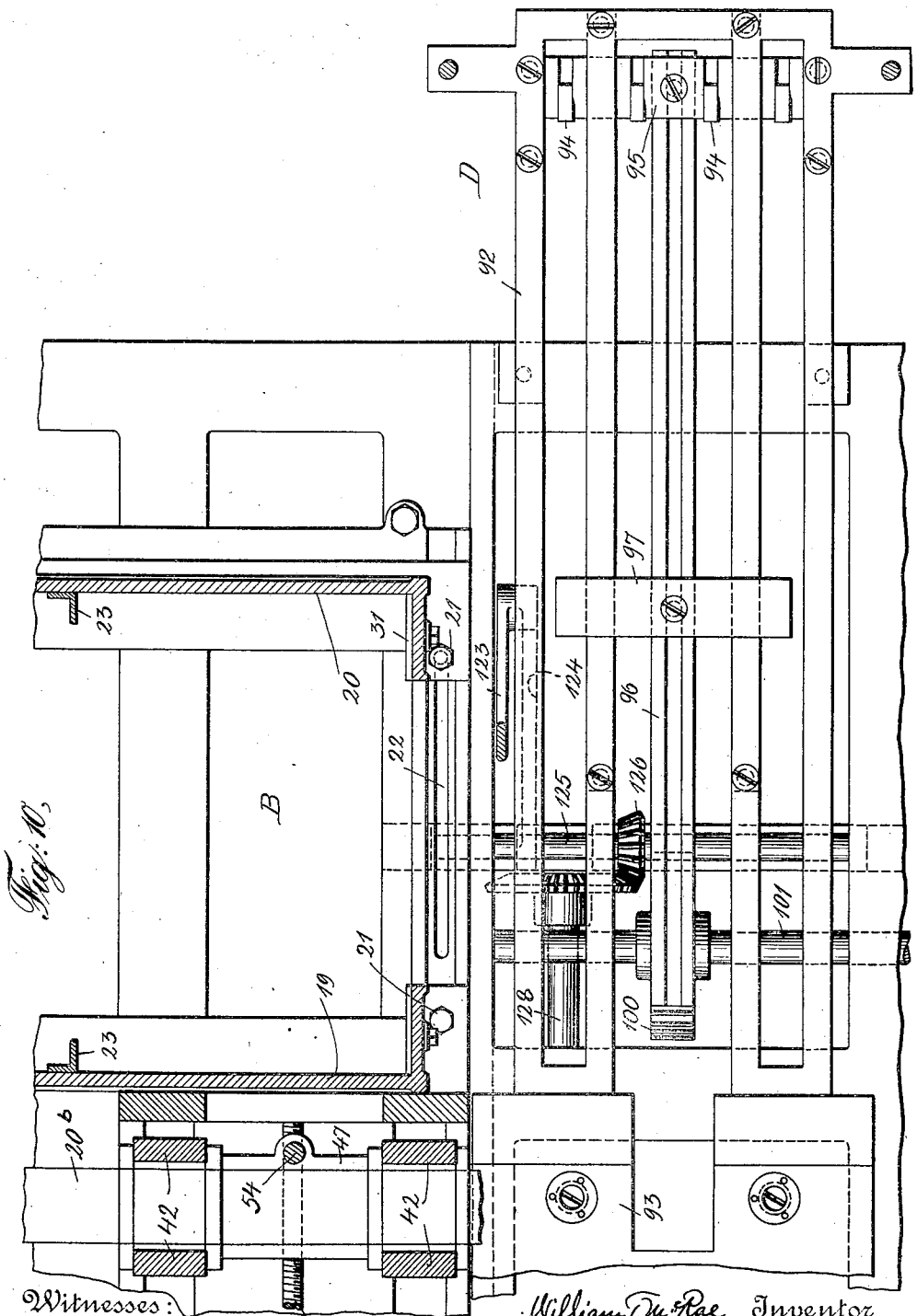
Figure 11:
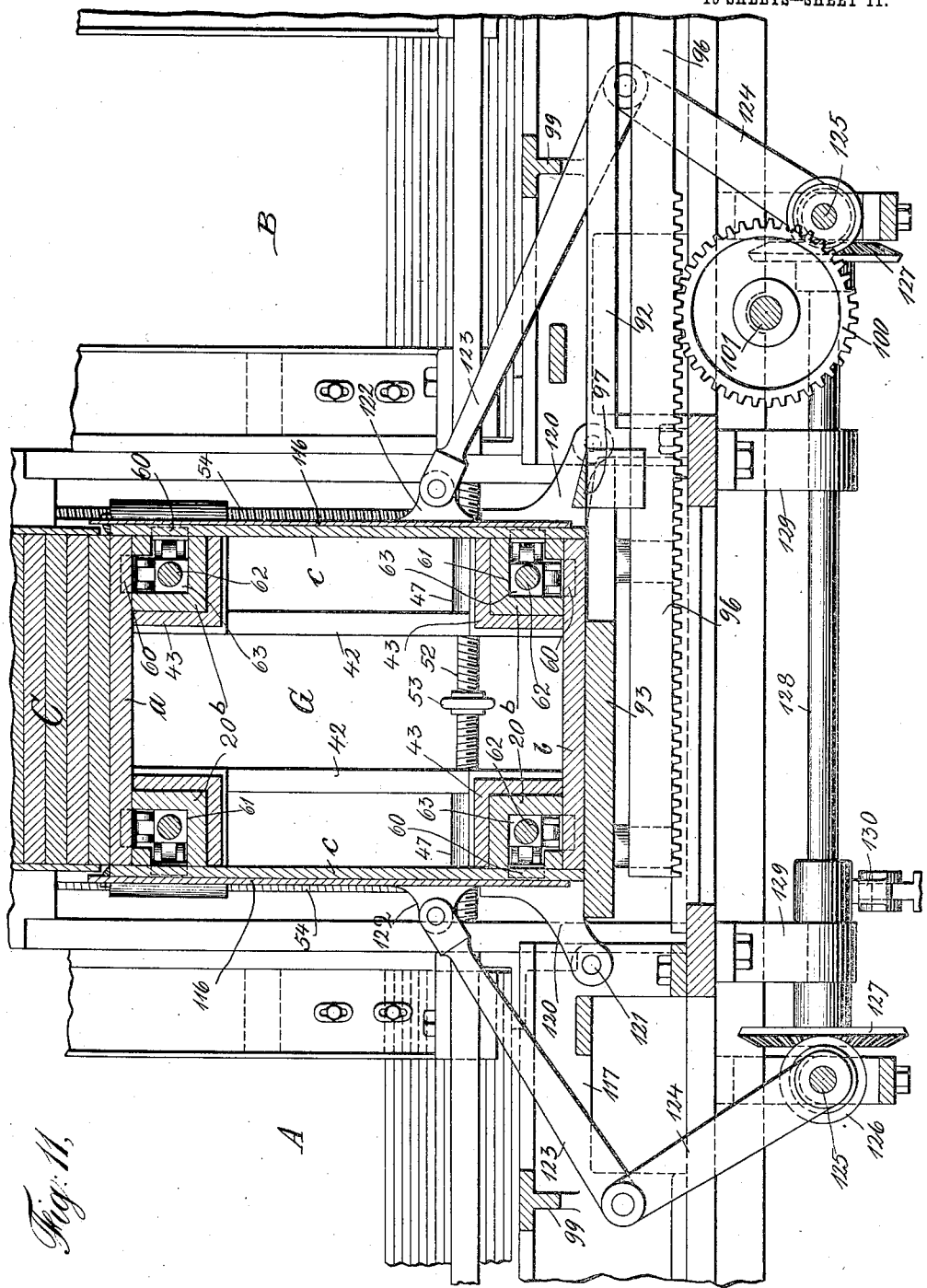
Figure 12:
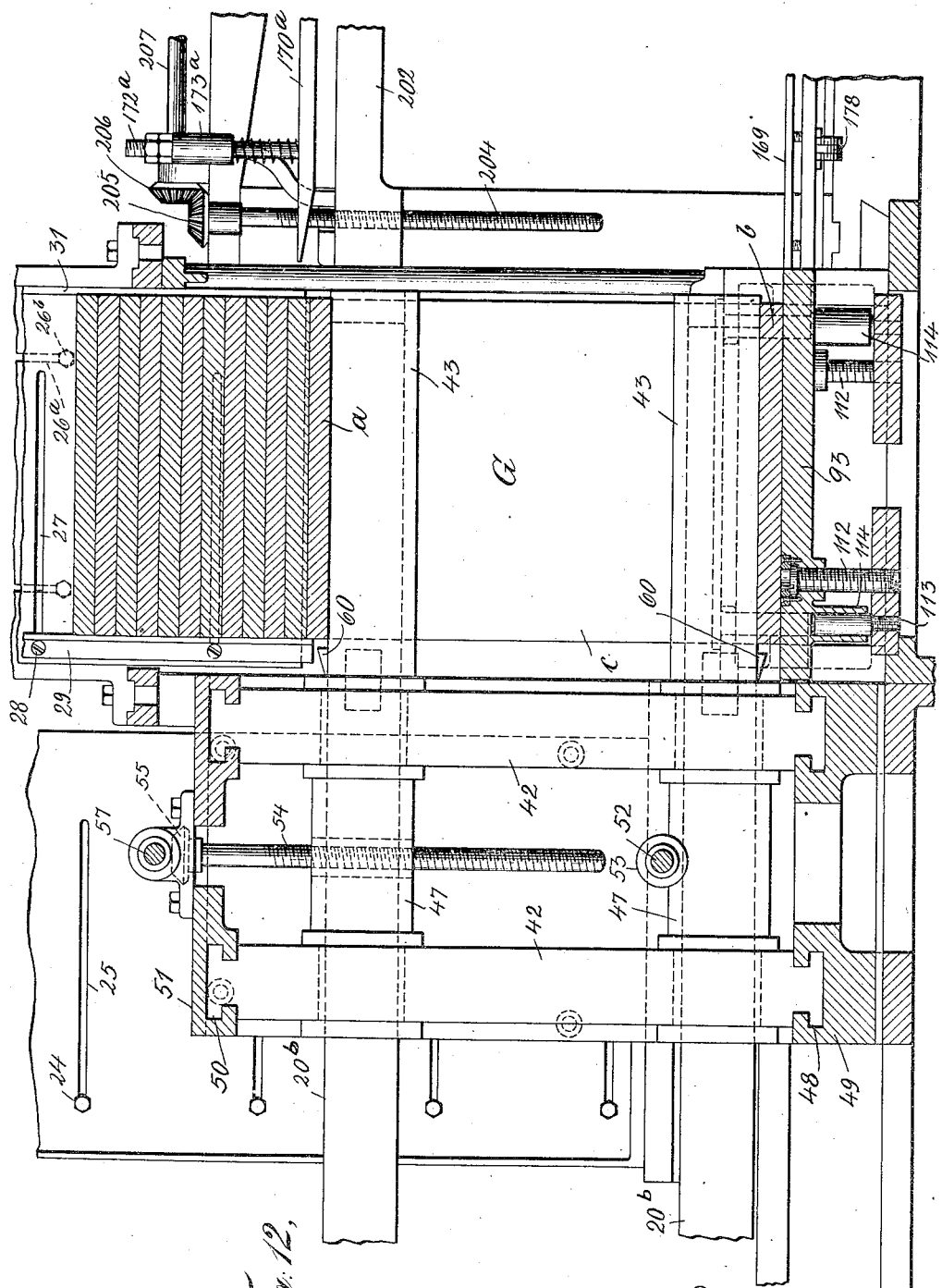
Figure 13:
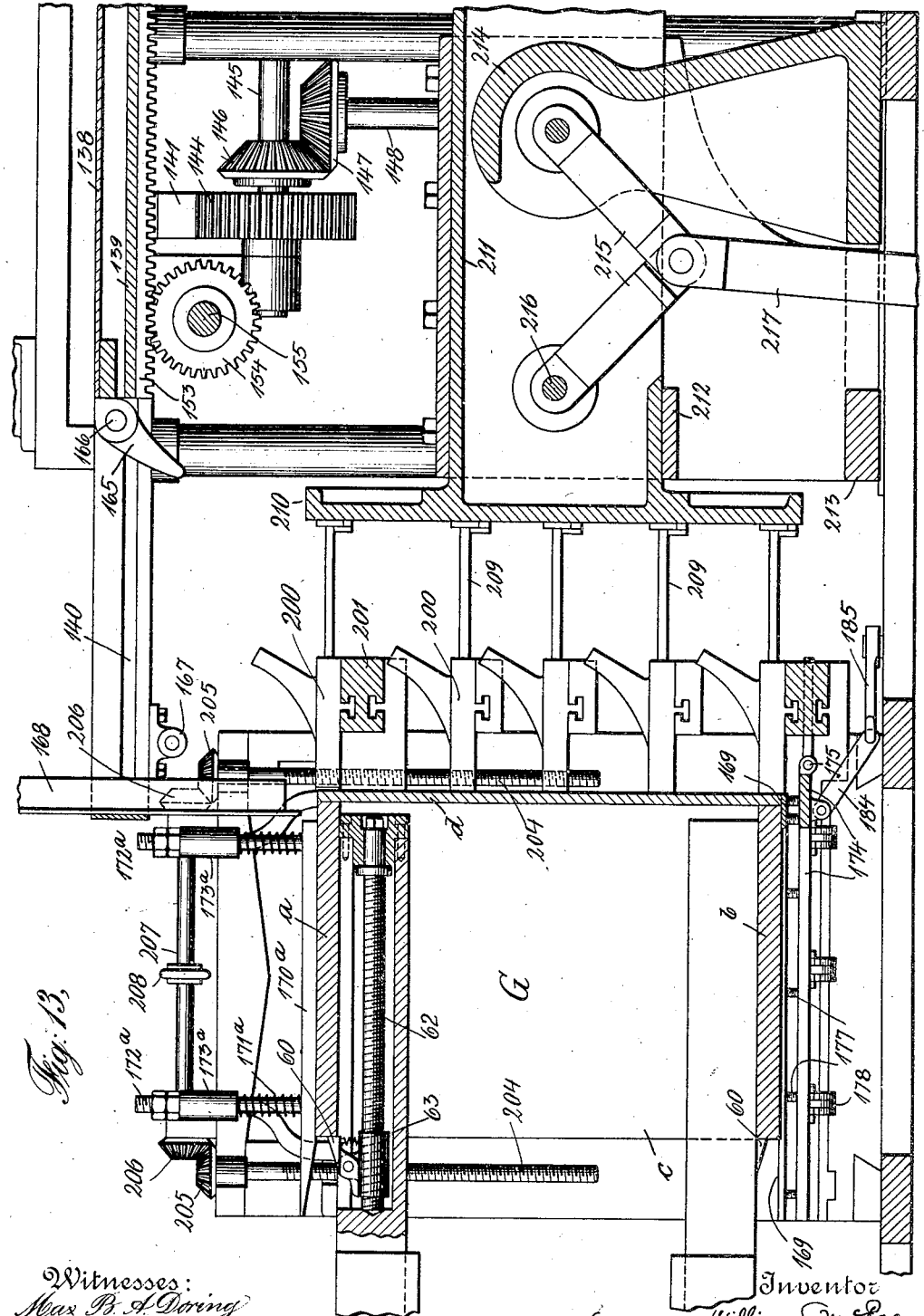
Figure 14:
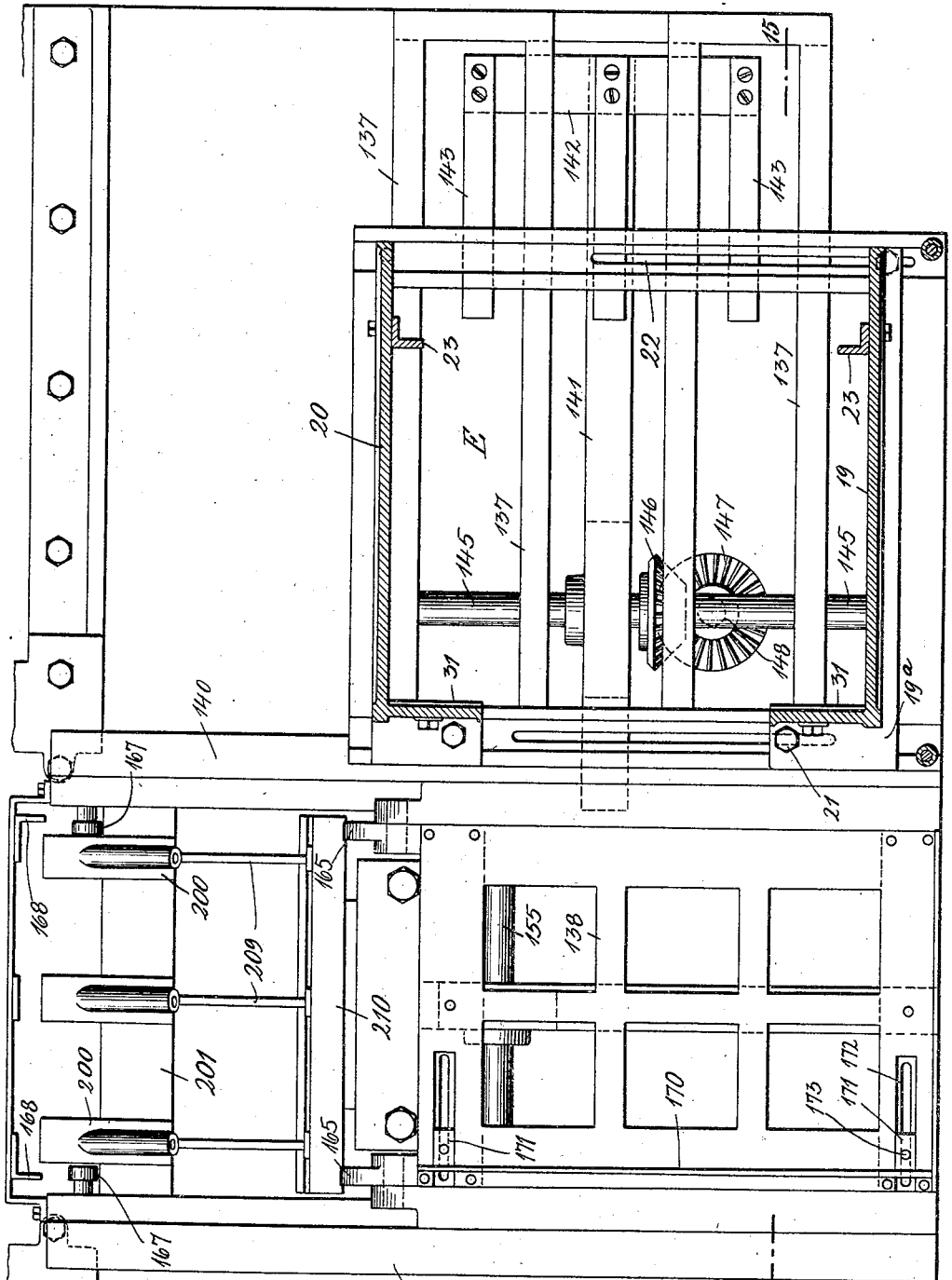
Figure 15:
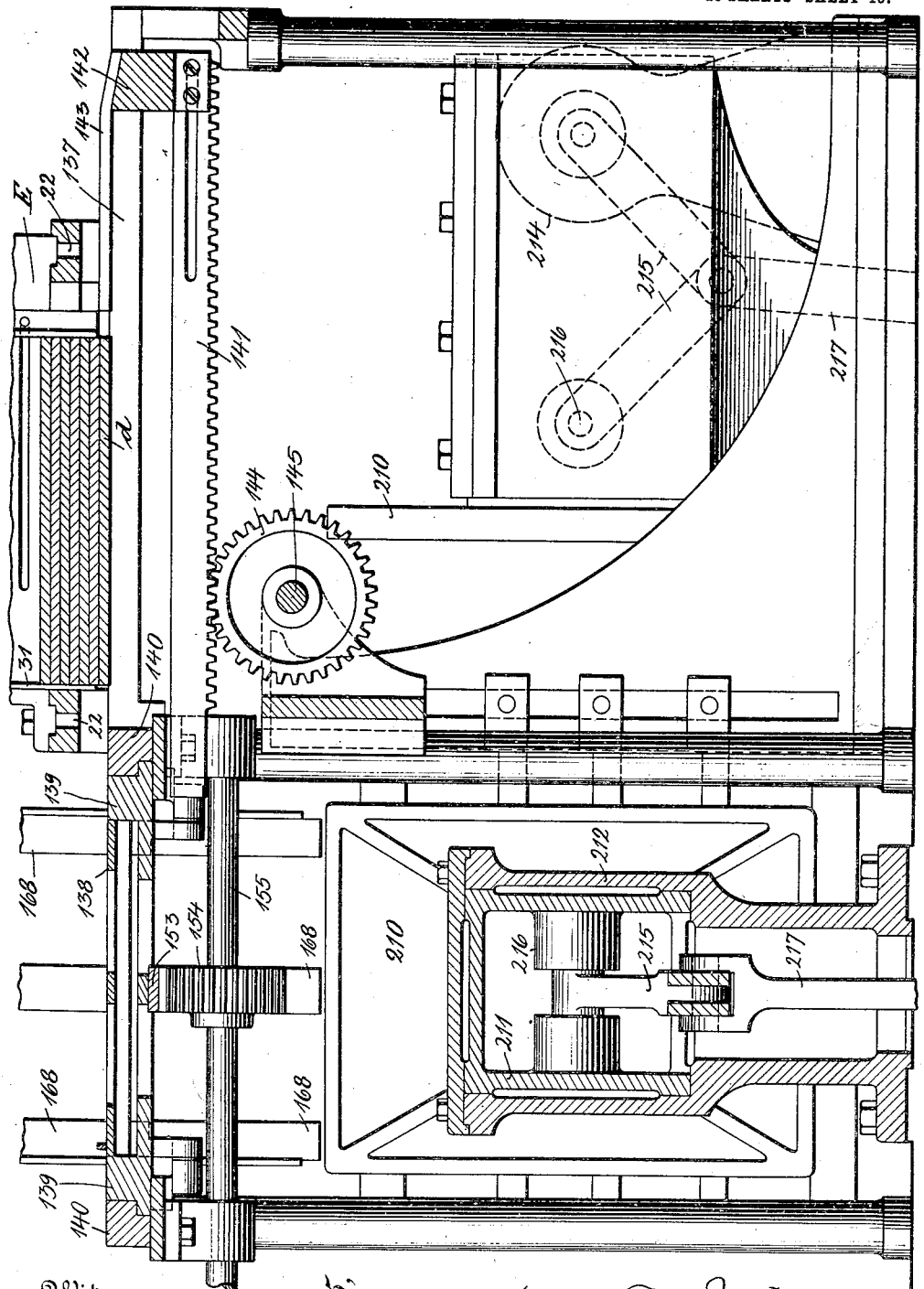
Figure 16:
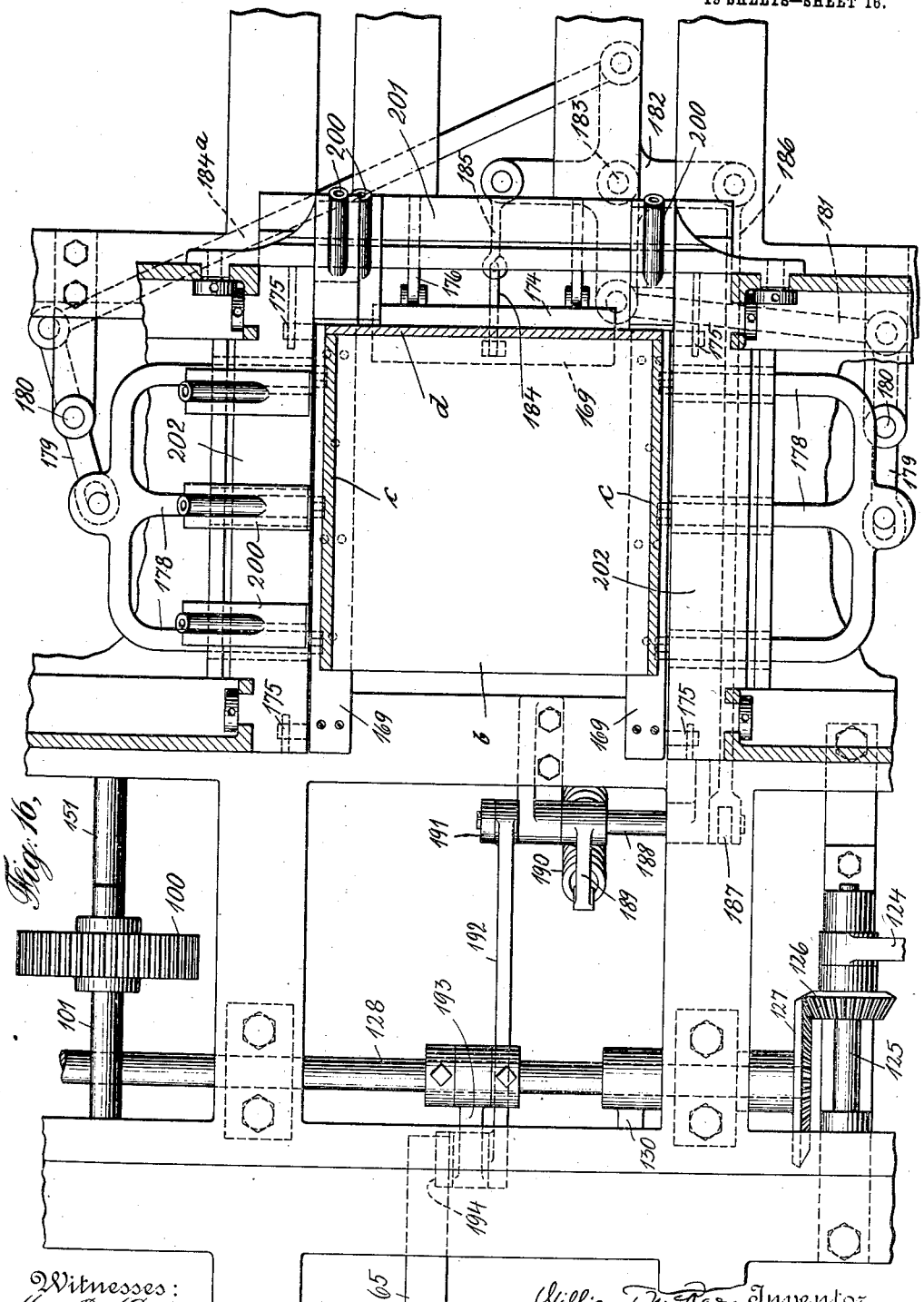

Figure 1 is a front elevation of the machine. Fig. 2 is a top plan view thereof showing the arrangement of the various hoppers. Fig. 3 is a right hand side elevation. Fig. 4 is a left hand side elevation. Fig. 5 is a horizontal sectional view of one of the side board hoppers, showing the adjustable construction thereof, and the means for ejecting the bottom board and placing it upon the tilting table hereinafter referred to. Fig. 6 is a vertical section on the line 6—6 of Fig. 5. Fig. 7 is a view similar to Fig. 6, but shows the tilting table onto which one of the side boards has been pushed, and connecting mechanism. Fig. 8 is a vertical sectional view of the tilting table in a right angle to Fig. 7, showing its side board hopper and a front view of the four former bars around which the box is formed or shaped. Fig. 9 is a view similar to Fig. 8 but showing the second side board hopper with its tilting table, the mechanism for tilting such table, and a section from the lower end board hopper. Fig. 10 is a horizontal section through the second side board hopper and shows the mechanism for pushing the lower end board. Fig. 11 is a vertical sectional view similar to Figs. 8 and 9, but shows the tables of the two side board hoppers tilted, thereby pressing the two side boards against the former bars. Fig. 12 is a central vertical section through Fig. 11, showing the adjustments for the former bars for the stationary table and the upper end board hopper. Fig. 13 is a vertical sectional view showing the four boards which have been placed around the former bars, pushed forward against the bottom board that has been brought into position from the bottom board hopper. Fig. 14 is a horizontal section through the bottom board hopper showing the push bars and tilting table. Fig. 15 is a vertical section on the line 15—15 of Fig. 14. Fig. 16 is a horizontal section illustrating the mechanism for operating the drop plates. Fig. 17 is a vertical section giving a side view of the mechanism shown in Fig. 16 and illustrating the mechanism for operating a plunger for nailing the boxes. Fig. 18 is a horizontal section above the bed plate of the machine, showing the driving mechanism for the various devices, and Fig. 19 is a vertical section for the same purpose.

The machine is provided with a suitable frame 10, and obviously any usual means can be employed for driving it. As shown it has a driving pulley 11 and a shaft 12, which connect by gears 13 and 14 with a counter-shaft 15, and this connects by gears 16 and 17 with the main shaft 18 which is the main driving shaft, and from which the mechanism of the machine is operated as hereinafter described.

On the top part of the machine are a series hoppers vertically arranged and marked A, B, C, D and E. The hoppers A and B are for the side boards of the box to be formed, the hopper C is for the upper end board, the hopper D for the lower end board, and the hopper E for the bottom board. When the machine is operated, the boards from these several hoppers are arranged around a former or form G, are nailed together, and finally discharged in the shape of a box. The mechanism for doing this will be described below. For convenience the hoppers which are similar, are made adjustable, and have opposed angle sides 19 and 20, which are adjustable back and forth in relation to each other, and the side pieces 20 have feet 20ª which are held to the machine frame by bolts 21 extending through slots 22, so that the part 20 can be secured in a desired position. To provide for the opposite adjustment, the side pieces have vertical angle irons 23, best shown in Figs. 5 and 14, which are adjustable laterally, being secured by bolts 24 which slide in the transverse slots 25 in the sides of the hoppers. The hopper C is located directly above the form bars or form G, as shown in Fig. 12, and the form serves as a bottom for the hopper. As the form is necessarily adjustable vertically to adapt it for making different sizes of boxes, the hopper C must also be vertically adjustable or extensible, and to this end it has at the bottom extensible side pieces 26 which are adjustable vertically by means of bolts 26$^b$ working in slots 26$^a$ in the hopper sides as shown in Fig. 1, and it has laterally adjustable angle plates 29 adjustable by the bolts 28 which move in the transverse slots 27 as shown in the same figure. The several hoppers with the exception of the hopper C have also on the side from which the boards are pushed out, a plate 31 (see Fig. 6) which is vertically adjustable to permit a single board to be pushed beneath it, and which is secured by bolts 32 working in the slots 33 in the hopper sides.

The form G around which the boxes are made, consists essentially of four rectangularly arranged slide bars 20$^b$ (see Figs. 6, 8 and 11) which form the corners of a skeleton structure around which the box is shaped, and these form bars are adjustable in relation to each other so that a box of desired size can be made around them. To this end the form bars 20$^b$ are at their rear ends secured to the horizontally moving carriage 40 which slides in the ways 41 on the machine frame. The form bars are guided through vertical frames 42 (see Figs. 5 and 8) which are adjustable laterally in relation to each other, and as a further brace, the form bars slide in the L shaped arms 43 which are four in number, the upper arms being open on their top and outer sides, and the lower arms on their lower and outer sides, as shown clearly in Fig. 8. The form bars 20$^b$ are secured to the horizontal bars 45 on the head or carriage 40, and the upper of these bars 45 moves in vertical ways 46 (see Fig. 5). The form bars also extend through guide boxes 47 which are held in the frames 42 (see Fig. 12) and one of the frames 42 can be moved laterally, and to this end the lower parts of the frame are T shaped and move in slots 48 in the part 49 of the frame, while the tops of the frame move in corresponding ways 50 on the rigid top plate 51.

To provide for adjusting the form laterally, a screw shaft 52 (see Figs. 11 and 12) which is oppositely threaded at the end portions and which has a milled collar 53 for turning it, is connected with the opposed parts 47 at the bottom, and for vertical adjustment screw shafts 54 are arranged at the sides of the form (see the same figures and also Fig. 2) these screw shafts 54 connecting at the top by means of bevel pinions 55 and 56 with a transverse screw shaft 57 which turns in suitable bearings 54ª and is provided with a milled collar for turning it. The pinion 56 can be splined on the shaft 57 to provide for necessary adjustment. It will thus be seen that by turning the shaft 52, the frames 42 may be spread and the form widened laterally, while by turning the shaft 57 the movement is transmitted to the screws 54 and the form can be adjusted vertically, the upper form bar 20$^b$ being thereby raised.

The parts of the form bars which extend forward from the parts 47 are slotted as shown at 61, and in each slot is arranged a pair of spring pressed dogs 60, the two upper dogs extending from the upper and outer sides of the form bars and the two lower pairs of dogs extending from the outer and lower sides of the lower form bars. These dogs are connected to nuts 63 which slide on the shaft 62, and by turning the screw shaft, the dogs can be adjusted so that they will properly engage the stock which is placed around the form. As shown in Fig. 11 this stock is represented by the upper and lower end boards $a$ and $b$, and the two side boards $c$, which go to form the aforesaid parts of the box.

When the stock is assembled around the form, the latter together with the stock is moved forward into position to be nailed as hereinafter described, and to provide for this movement the carriage 40 is necessarily moved horizontally in the machine. This is effected from a crank disk 65 which also has a cam on each side, and which is carried by a shaft 66, and the crank disk connects by a pitman 67 with a lug 68 on the under side of the carriage. This is shown in Figs. 4, 18 and 19. The lugs 68 connect with the carriage indirectly, being pivoted to the link 68ª, which is held to the carriage by the plates 68$^b$ and bolts 68$^c$, and so by adjusting the bolts the lugs 68 may be changed somewhat so as to affect the throw of the carriage, and consequently the carriage movement can by this means be adjusted. By reference to Fig. 19 it will be seen that the link 68ª is pivotally connected both to the pitman 67 and to the lugs 68, and that the link has shoulders fitting the lower part of the lugs and permitting it to turn slightly, while as stated, the adjustment is by means of the bolts 68ᶜ. By this means a very nice and easy adjustment is made regulating the throw of the carriage 40.

The shaft 66 is driven by a mutilated gear 69 on the driving shaft 18, which connects with the gear 70 on the shaft 66. The object of the mutilated gear is to time the carriage to provide for the necessary rest while certain operations of box making are going on as hereinafter described.

Except in the hopper C the stock rests on ledges 71 at the bottom of the hoppers, as shown clearly in Figs. 5 and 6, where the hopper A is illustrated, and the side boards in the hoppers A and B are similarly moved forward to form a box, the bottom board being taken from each pile. This is accomplished by the push bars 72 which are secured to the slide 73 which moves in longitudinal ways 74 beneath the hoppers, and the push bars are secured to the slide by means of bolts 75 which extend through slots 72ᵃ in the push bars, and the heads of which fit in slots 73ᵃ in the slide 73. This arrangement provides for easy adjustment of the push bars. The slide 73 has on the under side a rack 75ᵃ which meshes with and is driven by a gear wheel 76 on the counter-shaft 77 (see Figs. 5 and 6) and the gear wheel 76 connects with the shaft 77 by means of a clutch 78 having a dog 79 which when slid in one direction releases the gear from its shaft. The clutch is not shown in detail because it is of a common form. When the push bars 72 have moved forward to push the bottom board from beneath the pile, a cam 80 at the rear end of one of the push bars strikes the dog 79, pushes it inward and releases the gear wheel so that the gear thereupon is free on the shaft and the other operations of the machine are not interfered with. The push bars are moved back by the arm 81 on the carriage 40, which strikes an abutment 82 adjustable in the block 83, the latter being attached to the rack 75ᵃ. The shaft 77 is driven by the bevel gears 84 and 85 which connect it with an inclined shaft 86, and the latter has at its lower end a bevel pinion 87 (see Figs. 4 and 5) which connects with a bevel pinion 88 on the counter shaft 89, and the latter through similar gears 88ᵃ and 87ᵃ, shaft 86ᵃ, pinions 85ᵃ and 84ᵃ, connects with a shaft 77ᵃ which is arranged beneath the hopper B as shown in Fig. 4 for effecting the same operations already described. The shaft 89 is driven by a gear 90 and mutilated gear 91 connecting it with the driving shaft 18. Thus it will be seen that I provide for carrying forward two side boards simultaneously, and they are delivered upon tilting tables hereinafter referred to, to be turned up against the sides of the form G, that is against the form bars 20ᵇ. At the same time the top end board $a$ is carried forward from beneath the hopper C, and the following mechanism is used for carrying in the lower end board $b$ and placing it beneath the form G, as shown in Fig. 11.

A skeleton frame 92 (see Fig. 10) forms the bottom of the hopper D, and this lies opposite and in the same horizontal line with a plane 93 which lies beneath the form G, as shown in Figs. 10 and 11. The frame 92 extends outward beneath the hopper bottom and inward to a point near the form, and to provide for pushing forward the successive bottom end boards, the frame has projecting up through it a series of spring pressed dogs 94 which tilt freely forward, but have suitable stops to prevent them from tipping back, as shown clearly in Fig. 9. These dogs are carried by the cross head 95 which is secured to and moved by a rack 96, extending longitudinally beneath the skeleton frame, and the rack also carries a second cross head 97 (see Fig. 9) which is beveled on top, and the two cross heads can be adjusted with relation to the rack 96 so as to be set a predetermined distance apart, which distance will depend on the size of the box heads or ends. The cross head 97 is adapted to slide back beneath an end board $b$, and is pushed inward ready to engage a second board, but its inner edge is abrupt and pushes the board inward beneath the swinging dogs 98 (see Fig. 9) which dogs are pivoted to one of the longitudinally adjustable supports 99, which are arranged beneath the hopper B as shown. It will be seen that when the rack 96 is moved inward, the dogs 94 will carry in the lower end board in the hopper D to the position shown in Fig. 9, and the movement of the rack will cause the cross head 97 to slide beneath the first mentioned board, the dogs 98 preventing the board from being carried back. On the next inward movement of the rack the rear edge of the board that had been previously advanced as described, is caught by the cross head 97, and is thereby carried on to the plane 93 in proper position to become the lower end board of the box to be made, that is, in registry with the upper end board then lying upon the form bars 20ᵇ, at the same time the lower board in the hopper D is brought into the place or position vacated by the first board, and so on.

The rack 96 is driven by a gear 100 (see Figs. 8, 9 and 11) and this gear is carried by a shaft 101 which extends horizontally of the machine as shown best in Fig. 18, and the shaft connects by gears 102 and 103 with a counter shaft 104, and this connects by bevel gears 105 and 106 with the shaft 77ᵃ already referred to. The shaft 77ᵃ connects by gears 107 and 108 (see Figs. 18 and 4) with a counter shaft 109, and this connects by a gear 110 and rack 111, with the carriage 40. Thus it will be seen that when the carriage is being returned, the shaft 77ª will be out of driving connection with the shaft 18, because of the mutilated gear 91, and so the return movement of the carriage will through the rack 111, and the gearing connected with the shaft 101 just described, actuate the rack 96 so as to carry it back to normal position.

To provide for boards of different thicknesses, the plane 93 is adjustable as described in the former patent referred to, and it is adjusted vertically by the screws 112 and 113, the latter entering guide posts 114, and the edge of the plane 93 next the skeleton frame 92 is pointed or beveled as shown at 93ª, so that the end boards can readily slip onto the plane.

Referring now to Figs. 6 and 11, it will be seen how the two side boards, that is the ones on the two sides of the machine in the hoppers A and B are moved forward upon the tilting table ready to be placed against the form in position for nailing. I will describe the mechanism on one side of the machine as this is duplicated on the other. When the pusher bars 72 are pushed forward they shove the lowermost board a (see Fig. 7) over an inclined plane 115 upon the tilting table 116, which lies upon an adjustable support 117, this being secured by bolts 118 to the main frame. The support 117 has an abutment 119 (see Fig. 7) opposite one edge to prevent a board being pushed on too far, and it has also an abutment 119ª near its free edge to prevent a board from being moved out too far in that direction by the action of the table in tilting. The abutment 119ª can be adjusted in and out in slots 119ᵇ (see Fig. 2) to adapt it to different sizes of boards. These abutments also push down on the edges of the boards after they are against the form as shown in Fig. 11.

Each table 116 has lugs 120 on the under side and 117. The table has also on the under side near the center, a lug 122 which connects by a link 123 with a crank 124 on the shaft 125 (see Figs. 6 to 11) and this shaft connects by pinions 126 and 127 with a shaft 128 extending horizontally beneath the machine, and the latter is mounted in suitable bearing 129 (see Fig. 11) and has a crank 130 (see Fig. 7) connecting by means of the link 131 with a crank 132 on the rock shaft 133, the latter being journaled in suitable supports and having an arm 134 with a roller 135 thereon, the roller running in the cam groove 136 of the crank disk 65 already referred to. It will thus be seen that the movement of the cam will through the connecting lever mechanism just described, give a quick action to the table 116 and cause the latter to slap a side board c up quickly against the form G, that is against the upper and lower form bars 20ᵇ and in registry with the upper and lower end boards a and b.

When the above movements have taken place, the boards a, b and c are in the position shown in Fig. 11, and they then move forward with the form G beneath the nailing mechanism to be hereinafter described, and in position to have the bottom board d nailed to them.

The bottom boards are carried in the hopper E (see Fig. 14) which is like the hoppers already described, and this has beneath it a skeleton bottom 137 on which the bottom boards rest and the bottom is in the same horizontal plane with the tilting table 138 which is hung in the slide frame 139, the latter moving in the way 140 and in a direction to bring the bottom board d thereon, in position to be slapped up against the side and end boards already described. This is best shown in Figs. 14 and 15. The frame or bottom 137 has beneath it a sliding rack 141 which is provided with a cross head 142 having pusher bars 143 thereon, and these come outward beyond the bottom of the hopper E and engage the lowermost board d so as to push it forward upon the tilting table 138, the latter acting in a general way like the tables 116 already referred to, but more like the tilting tables referred to in my former application. The rack 141 engages a gear 144 on the shaft 145 (see Figs. 14 and 15) and the latter connects by bevel pinions 146 and 147 with a vertical shaft 148 which is mounted in suitable bearings on the machine frame, and connects at its lower end by pinions 149 and 150 (see Fig. 18) with the horizontal shaft 151 extending beneath the machine and connecting by a gear 152 with the gear 100 already referred to for operating the rack 96, so that the racks 96 and 141 are similarly and simultaneously operated.

The table 138 slides at right angles to the table 137 (see Fig. 13) and it is moved in conjunction with its holding frame 139 by a rack 153 which is driven by a gear 154 on the shaft 155, and the latter connects by bevel pinions 156 and 157 with the vertical shaft 158, which at the bottom has a gear 159 shown by dotted lines in Fig. 18, which engages a rack 160 on the end of a connecting rod 161, this having a crank connection with a gear wheel 162 on the shaft 163, and the latter meshes with and is driven by a gear 164 on the main driving shaft 18.

When the table 138 and its frame 139 slide inward toward the form G (see Fig. 13) the depending dogs 165 which are pivoted to the frame near the inner edge of the table as shown at 166, strike the rollers 167 which are supported in the paths of the said dogs, and the table 138 is thereby quickly thrown up into a vertical position, and the bottom board *d* thereon is thrown inward into vertical position against the angle iron guides 168, and the board then drops down as shown in Fig. 13 into proper registry with the boards *a*, *b* and *c* of the box, the lower edge of the board *d* striking upon the drop plate 169 which is in position to receive it and which in conjunction with the two other similar drop plates, support the box which has been brought forward into position upon the said drop plates by the advance movement of the form G. To prevent the board *d* from being pushed too far over the table 138, the latter has an abutment 170 at one side which has flanges 171 working in slots 172 in which it is fastened by bolts 173, this arrangement making the table adjustable for boards of different widths.

To insure that the upper and lower edges of the side boards *c* shall be flush with the edge of the upper end board and the lower end board respectively when the form and the boards are moved forward preparatory to nailing, yielding presser bars 170$^a$ are used (see Figs. 12 and 13) similar to those described in the former application referred to. These are beveled on the ends next the boards which are slid under them, and they have on their backs studs 172$^a$ around which are spiral springs 171$^a$ arranged between the presser bars and the arms 173$^a$ so as to press down firmly on the stock.

The drop plates 169 above mentioned are similar to those described in the former application, and they are adjustably supported on lower plates or leaves 174. The two side leaves are pivoted as shown at 175 in Fig. 16, and the third plate 174 which is at right angles to the two side plates, has ears on the under side pivoted to links 176 which are connected to a four armed lever presently referred to. The plates 169 are adjustably connected with the leaves 174 by screws 177 (see Fig. 13). The two side leaves 174 are each pivoted to a sliding fork 178, which at its outer end is slidably connected with a lever 179 (see Fig. 16) and the latter is pivoted centrally as shown at 180 and is connected at one end to an arm or link 181 which in turn is pivoted to one arm of a four armed lever 182, this being fulcrumed as shown at 183. The second lever 179, that is the one at the top of Fig. 16, connects with an arm of the four armed lever just referred to, by a link 184$^a$, while a link 184 connects to the third leaf 174 with an arm of the lever 182, by means of the link 185. One arm of the lever 182 connects by a link 186 (see Figs. 7, 16 and 17) with a crank arm 187 on the rock shaft 188, which is hung in a suitable support and has a second arm 189 connecting with a part of the machine by the spring 190. The rock shaft 188 and connected parts thus move in one direction by the spring just referred to, and in the other direction by the following cam actuated mechanism. A crank 191 on the rock shaft 188 (see Fig. 7) connects by a link 192 with a supporting arm 193 which rides free on the shaft 128, and at the junction of the link and arm is a roller 194 fitting the cam groove 195 of the crank disk 65. Thus the cam moves the rock shaft 188 and the drop plate mechanism against the tension of the spring 190, which returns the parts to normal position and holds the cam roller against the face of the cam.

When the assembled box parts are in the position described around the form G and on the drop plate 169, the functions of this invention, so far as this application is concerned, are performed, and it makes no difference how the parts of the box are fastened together, whether by matched corners or by nailing. I have shown, however, in connection with the mechanism for assembling the box parts, a nailing mechanism which shows how the box is finished, but which I will describe in rather general terms so as to make clear how the machine works, but will not describe in detail as I have claimed the nailing mechanism under a separate application filed simultaneously herewith. The nailing mechanism is also similar to that shown in the former application, but I claim it as my invention. On opposite sides of the machine are the nail hoppers 195 forming a part of the general nailing mechanism F, and in the upper and outer parts of the hoppers are the inclined plates 196 having nail slots 197 therein, and they discharge upon vibratory inclined nail plates 197$^a$ having slots 198 therein. The nails are delivered through flexible slots or tubes 199 to nail holders 200, which I will not describe in detail but which are grouped around three sides of the assembled box parts so as to nail the side pieces to the end pieces and nail the bottom boards to the end and side pieces. The nail holders are carried on adjustable bars 201 and 202 (see Figs. 13 and 17) and these are adjustable in ways 203 by means of the screw shafts 204 (see Fig. 13) which are held in suitable bearings and connect by pinions 205 and 206 with the cross shaft 207 which has a milled wheel 208 for turning it and so turning the screw shafts and adjusting the nail holders. The several nail holders are provided with plungers 209 for driving the nails which are delivered in them, and the plungers are actuated by the driving heads 210 which have their shanks 211 arranged to slide in a guide 212, while casings 213 inclose parts of the mechanism. Extending into the hollow shank 211 is a head 214, and toggle levers 215 are connected to the head 214 and to the shank 216 (see Fig. 13), while at the points where the toggles connect they are united to a lever 217 which extends downward and is connected to a strap 218 (see Fig. 17) of an eccentric 219 which is secured to the shaft 220, and the shaft 220 of the two side eccentrics connects by gears 221 and 222 (see Fig. 18) with a cross shaft 223 which also serves to drive the end eccentric 219 which is connected with the end head 214. The shaft 220ª of the end eccentric connects by gears 224 and 225 with a shaft 226 which connects with the shaft 223 just above mentioned by gears 227 and 228. The shaft 223 is driven from both ends, and it connects by gears 229 and 230 with shafts 231 (see Fig. 18) one of these shafts 231 connecting on one end by gears 232 and 233 with a shaft 234, and this in turn connects by a gear 235 with the mutilated gear 236. The second shaft 231 has its connected gear 233 driven by a gear 235ª (see Fig. 4) which connects with a mutilated gear 236ª corresponding to the gear 236 just above referred to. The mutilations in these gears are such as to force the driving heads 210 in simultaneously and at the right time to drive the nails into the assembled box parts, and the driving mechanism is at rest while the parts of the box are assembled.

On the front of the machine (see Fig. 1) is a line of lever mechanism which I will refer to in a general way to avoid confusion, but it has nothing to do with the present invention. A screw shaft 237 is arranged to force the base 214ª of the sliding head 214 inward into the right close relation with the box, and the shaft has a connection by means of the wheel 238 with the lever 239, which connects by a pinion 240 with the tilting lever 241, the latter being fulcrumed at 242 and having its lower end connected at 243 with a yoke 244 which rides on the driving shaft 18. The yoke has a stud 245 thereon which is engaged by the tongue 246 on the driving shaft so as to actuate the lever mechanism just described and so move the base 214ª, but this matter is not shown in detail and is referred to generally, but is shown, described and claimed in the application for nailing mechanism which I am filing simultaneously with this application.

After the boxes have been nailed around the form G, and over the drop plates 169, the form is withdrawn and the drop plates are swung downward so that the completed box is dropped upon a carrier 247 (see Figs. 1, 3 and 19) which carrier moves constantly and carries the boxes as they are dropped outward through the side of the machine and dumps them. This carrier is arranged between the walls 10ª of the machine (see Fig. 19) and it runs on suitable drums 248 one of which is driven by a pulley 249 or equivalent driving mechanism, and as shown the pulley is turned by the belt 250 which runs over suitable guide pulleys 251 and 252, and connects with a pulley 253 on the driving shaft 18.

It will thus be seen that I have described a machine which accurately assembles the sides, ends, and bottoms of a box, holds the parts in the right relation for nailing, and discharges in a convenient way the completed box.

This invention is along very similar lines to the one shown in my former application referred to, and the improvement lies generally in details of construction which improve the working of the machine and which details I have covered by the following claims.

Having thus fully described my invention, I claim as new and desire to secure by Letters Patent:—

1. In a box machine, the combination with the moving form and means for setting boards around it, of the sliding carriage connected to the form, the crank operated pitman for moving the carriage, and the link adjustably connecting the pitman and the carriage.

2. In a machine of the kind described, the combination with the box form, of the sliding carriage connected to the form, a lug on the under side of the carriage, a link pivoted to the lug and adjustable in relation thereto, and a crank operated pitman connected to the link.

3. The combination with the carriage and the box form which it carries, of the lug beneath the carriage, the link pivoted to the lug, bolts for adjusting the link on the lug, and a crank mechanism connected with the link to move the carriage.

4. In a box machine, the combination with the hopper, the form, and the main carriage to move the form, of push bars to slide the stock from beneath the hopper, a gear mechanism for actuating the push bars, means for automatically throwing the gear mechanism out of gear, and a direct positive connection between the push bars and the carriage, by which the return of the carriage returns the push bars.

5. The combination with the hopper, the main carriage, the form carried thereby, and mechanism for assembling boards around the form, of the push bars slidable beneath the hopper, a gear mechanism for moving the push bars forward, means for automatically throwing the gear mechanism out of gear when the push bars reach the limit of their stroke, and an adjustable arm and abutment connecting the push bars with the carriage and adapted to return the push bars by the movement of the carriage.

6. A box machine comprising a series of stock hoppers, a main carriage, a form moved with the carriage, swinging tables hinged directly opposite the form and arranged to receive the stock from the hoppers and swing it against the form, a lever mechanism for actuating the tables, push bars to slide the stock from certain of the hoppers, a gear mechanism for actuating the push bars, means for throwing the gear mechanism out of gear, and a direct, positive connection between the push bars and the carriage, by which the return of the carriage returns the push bars.

7. A box machine comprising a series of stock hoppers, a main carriage, a form sliding with the carriage, swinging tables hinged directly opposite the form and arranged to receive the stock from the hoppers and swing it against the form, a lever mechanism for actuating the tables, push bars slidable beneath certain of the hoppers, a gear mechanism for moving the push bars forward, means for automatically throwing the gear mechanism out of gear when the push bars have reached the limit of their stroke, and an adjustable arm and abutment connecting the bars with the carriage and adapted to return the push bars by the movement of the carriage.

WILLIAM T. McRAE.

Witnesses:
WARREN B. HUTCHINSON,
RALPH LANCASTER.